(12) United States Patent
Oliver et al.

(10) Patent No.: US 10,832,258 B2
(45) Date of Patent: Nov. 10, 2020

(54) BOUNTY TRACKING FOR REFERRAL

(75) Inventors: Michael Oliver, Wayne, NJ (US);
Diego S. Rozensztejn, Brighton, MA (US); Jeffery L. Harris, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1767 days.

(21) Appl. No.: 13/469,629

(22) Filed: May 11, 2012

(65) Prior Publication Data
US 2013/0304551 A1 Nov. 14, 2013

(51) Int. Cl.
*G06Q 30/00* (2012.01)
*G06Q 30/02* (2012.01)
*H04N 21/2543* (2011.01)
*H04N 21/254* (2011.01)
*H04N 21/2547* (2011.01)
*H04N 21/475* (2011.01)
*H04N 21/258* (2011.01)

(52) U.S. Cl.
CPC ......... *G06Q 30/02* (2013.01); *G06Q 30/0214* (2013.01); *G06Q 30/0239* (2013.01); *H04N 21/254* (2013.01); *H04N 21/2543* (2013.01); *H04N 21/2547* (2013.01); *H04N 21/25866* (2013.01); *H04N 21/475* (2013.01)

(58) Field of Classification Search
CPC ................................... G06Q 30/0207–30/0277
USPC ............. 705/14.16, 3, 2, 26.1, 14.13, 14.19, 705/14.25, 14.26, 14.3, 14.39, 14.4, 705/14.73, 26.7, 27.1, 300, 346, 35, 500, 705/80; 715/205, 862; 235/487; 283/117, 56; 600/300; 707/999.103; 709/206
See application file for complete search history.

(56) References Cited

U.S. PATENT DOCUMENTS 9,152,985 B2 * 10/2015 Wakabayashi ..... G06Q 30/0276
2004/0044566 A1 * 3/2004 Bostelmann et al. .......... 705/14
(Continued)

FOREIGN PATENT DOCUMENTS

WO   WO-2010088764 A1 * 8/2010   ......... G06Q 30/0246

OTHER PUBLICATIONS

Liu, Yang et al., Implementing Digital Right Management in P2P Content Sharing System ICA3PP, LNCS, 2007 (Year: 2007).*
(Continued)

*Primary Examiner* — Michael Bekerman (57) ABSTRACT

A method includes accessing at least one referral information entry. Each referral information entry associated with a referred user device is based on a referral from a referring partner application to a product. Each referral information entry includes an identifier for the referring partner application, a product identifier for the product, a time stamp of the referral, and a unique identifier associated with the referred user device. Sign-up information is received from a user device. The sign-up information includes a unique identifier of the user device, and a time of sign-up. The method includes mapping the sign-up information to the at least one referral information entry to determine whether the user device is one of the referred user devices. A determination whether the bounty requirements are met is made based on the mapped information and at least one predetermined business rule for referral bounties.

20 Claims, 9 Drawing Sheets

(56) References Cited

U.S. PATENT DOCUMENTS

| | | | |
|---|---|---|---|
| 2004/0054555 A1* | 3/2004 | Piccionelli | G06Q 30/06 705/51 |
| 2004/0103022 A1* | 5/2004 | Chilcoat, III | G06Q 30/0214 705/14.16 |
| 2005/0010563 A1* | 1/2005 | Gross et al. | 707/3 |
| 2006/0229936 A1* | 10/2006 | Cahill | G06Q 30/02 705/14.16 |
| 2007/0078734 A1* | 4/2007 | Oren | 705/27 |
| 2007/0213995 A1* | 9/2007 | Wall | G06Q 30/0239 705/14.16 |
| 2007/0282959 A1* | 12/2007 | Stern | 709/206 |
| 2008/0010139 A1* | 1/2008 | Elmer | G06Q 30/0208 705/14.11 |
| 2008/0167946 A1* | 7/2008 | Bezos et al. | 705/10 |
| 2008/0221992 A1* | 9/2008 | Bernstein | G06Q 30/02 705/14.16 |
| 2009/0234730 A1* | 9/2009 | Lee | 705/14 |
| 2009/0259547 A1* | 10/2009 | Clopp | G06Q 30/02 705/14.16 |
| 2010/0131385 A1* | 5/2010 | Harrang | G06Q 30/0277 705/26.1 |
| 2010/0205029 A1* | 8/2010 | Asherman | G06Q 30/02 705/64 |
| 2010/0223097 A1* | 9/2010 | Kramer | G06Q 30/0207 705/14.16 |
| 2011/0184794 A1* | 7/2011 | Friedland | G06Q 30/02 705/14.16 |
| 2011/0225029 A1* | 9/2011 | Pedersen | G06Q 30/0214 705/14.16 |
| 2012/0010923 A1* | 1/2012 | Yarmolich | G06Q 30/0201 705/7.32 |
| 2012/0035996 A1* | 2/2012 | McLean | 705/14.16 |
| 2012/0036003 A1* | 2/2012 | Tong | G06Q 30/0207 705/14.39 |
| 2012/0278186 A1* | 11/2012 | Hayton | G06Q 30/0214 705/14.73 |
| 2012/0296718 A1* | 11/2012 | Kennedy | G06Q 30/06 705/14.16 |
| 2013/0006738 A1* | 1/2013 | Horvitz et al. | 705/14.16 |
| 2013/0041761 A1* | 2/2013 | Voda | G06Q 30/0259 705/14.68 |

OTHER PUBLICATIONS

Iwata, Tetsuya et al., A DRM system suitable for P2P content delivery and the study on its implementation IEEE, 2003 (Year: 2003).*

Sung Jae-Youn et al., DRM Enabled P2P Architecture ICACT2006, Feb. 20-22, 2006 (Year: 2006).*

Salek, Mahyar et al., You Share, I Share: Network Effects and Economic Incentives in P2P File-Sharing Systems Internet and Network Economics, Lecture Notes in Computer Science, vol. 6484, 2010 (Year: 2010).*

\* cited by examiner

FIG. 3A

| REFERRAL ID | UNIQUE DEVICE ID | TIME STAMP | PRODUCT ID |
|---|---|---|---|
| P1 | N1 | JAN 2 23:05 | PID A |
| P1 | N2 | JAN 4 12:08 | PID B |
| P2 | N3 | JAN 8 09:09 | PID C |
| P2 | N4 | JAN 10 11:12 | PID D |

BOUNTY TRACKING FOR REFERRAL

BACKGROUND

Video service providers currently provide multiple services and programs, including cable television, network television, and video on demand, to their customers. In some instances, individual customers may receive combinations of these multiple services from a single video service provider.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may implement tracking of referrals for content in a digital and physical content system based on users and referring applications.

Consistent with embodiments described herein, deep-link tracking (i.e., based on referrals to specific products and services) may be implemented to monitor performance of the physical and digital content system on the mobile platform via partner applications in instances in which sign-up and purchasing is not allowed on the application or operating system of user devices that receive the referrals. The partner applications that refer users to the physical and digital content system may pass referral information through a deep-link uniform resource locator (URL) to the physical and digital content system.

Figure 1:
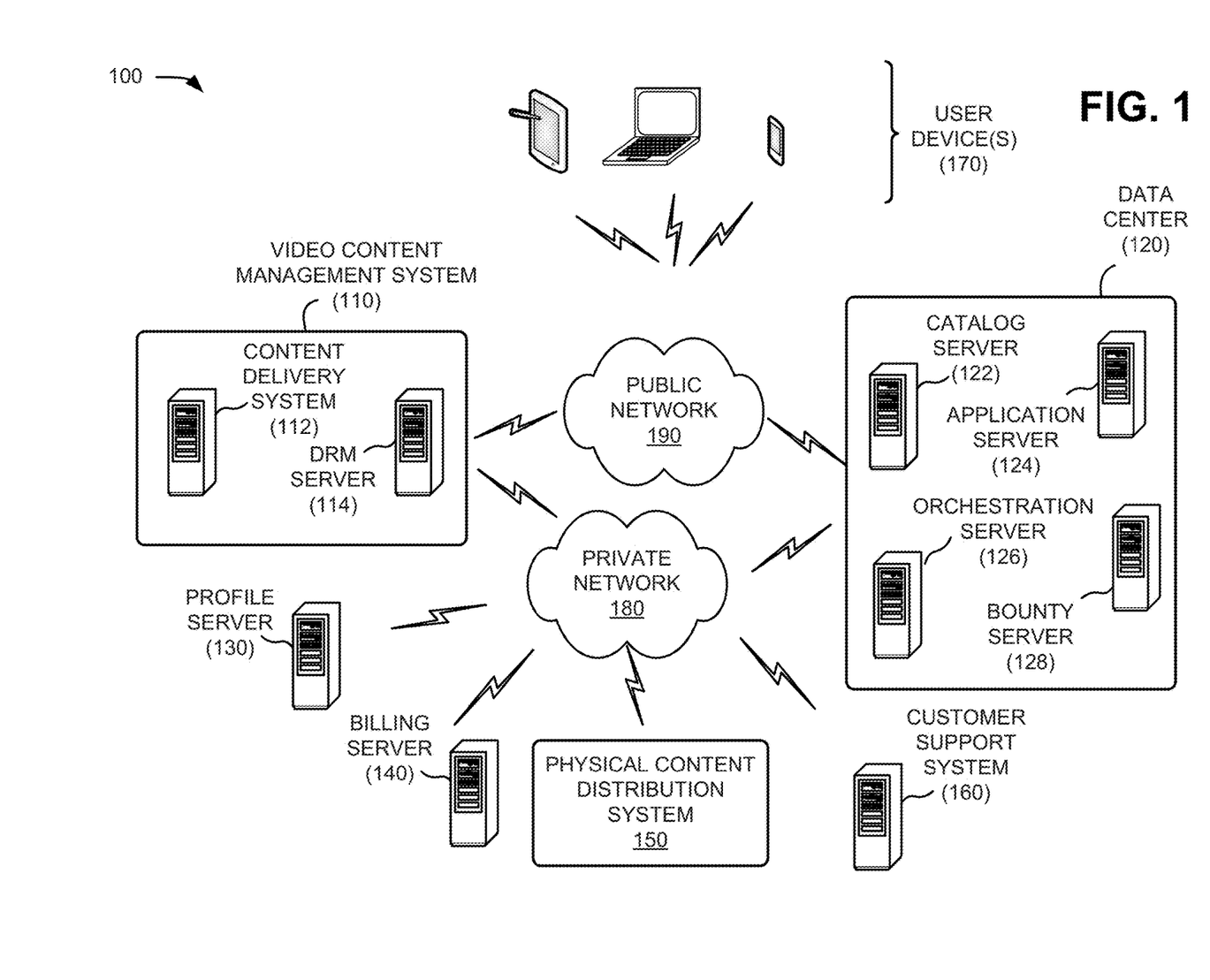
FIG. 1 is an exemplary network in which systems and/or methods described herein may be implemented.

FIG. 1 is an exemplary network 100 in which systems and/or methods described herein may be implemented. As illustrated, network 100 may include a video content management system (VCMS) 110, a data center 120, a profile server 130, a billing server 140, a physical content distribution system 150, a customer support system 160, user devices 170, a private network 180, and a public network 190. The particular arrangement and number of components of network 100 shown in FIG. 1 are illustrated for simplicity. In practice there may be more VCMSs 110, data centers 120, profile servers 130, billing servers 140, physical content distribution systems 150, customer support systems 160, user devices 170, and/or networks 180/190. Components of network 100 may be connected via wired and/or wireless links.

VCMS 110 may aggregate content, process content, and distribute content. In one implementation. VCMS 110 may include a content delivery system 112 and a digital rights management (DRM) server 114. VCMS 110 may aggregate content and transcode content into a digital format suitable for consumption on particular user devices 170. For example, VCMS 110 may include a transcoding device to convert an audio, video, or graphic file from one format to another (e.g., from one bit rate to another bit rate, from one resolution to another, from one standard to another, from one file size to another, etc.). VCMS 110 may also encrypt data and communicate with DRM server 114 to enforce digital rights.

Content delivery system 112 may deliver digital content from a backend server to user devices 170. In one implementation, content delivery system 112 may include a streaming server that provides streaming data packets (e.g., via a streaming URL) to user devices 170 (e.g., via public network 190). In one implementation, a streaming URL may be session-based, such that each URL can be used only once for one user device 170 for security purposes.

DRM server 114 may issue, validate, and/or enforce DRM licenses to a device client, such as an application running on one of user devices 170. In implementations herein, DRM server 114 may communicate with user device 170 to authenticate a user of user device 170, the particular user device 170, and/or an application residing on user device 170. For example, DRM server 114 may request/receive login information associated with the user, and compare the login information with stored information to authenticate the user. Additionally, or alternatively, DRM server 114 may request/receive device information (e.g., a unique device identifier) associated with user device 170, and may compare the device information with stored information to authenticate user device 170.

Data center 120 may manage the authorization, selection, and/or purchase of multimedia content by a user of user device 170. As shown in FIG. 1, data center 120 may include a catalog server 122, an application server 124, an orchestration server 126, and a bounty server 128. In one implementation, data center 120 may be accessed by user devices 170 via public network 190 (e.g., the Internet).

Catalog server 122 may provide a unified catalog of content in both digital and physical formats for users (e.g., of user devices 170) to order/consume (e.g., buy, rent, or subscribe). In one implementation, catalog server 122 may collect and/or present listings of content available to user devices 170. For example, catalog server 122 may receive digital and/or physical content metadata, such as lists or categories of content, from VCMS 110 and/or physical content distribution system 150. Catalog server 122 may use the content metadata to provide currently-available content options to user devices 170. Catalog server 122 may provide the content metadata to user device 170 directly or may communicate with user device 170 via application server 124.

Application server 124 may provide a backend support system for mobile applications residing on user devices 170. For example, application server 124 may permit user device 170 to download an application that enables a user to find content of interest or play downloaded or streaming content. The application may enable user device 170 to present information received from data center 120 to a user of user device 170 with in an interactive format to allow selection of particular digital or physical content. Application server 124 may provide content metadata, such as lists or categories of content for digital content, such as downloads and streaming content, and/or physical content, such as DVDs, Blu-ray discs, or memory cards. Application server 124 may provide the digital content in association with VCMS 110 and the physical content in association with physical content distribution system 150. Also, application server 124 may authenticate a user who desires to purchase, rent, or subscribe to digital or physical content. In one implementation, the interactions between application server 124 and user device 170 may be performed using hypertext transfer protocol (HTTP) or secure HTTP (HTTPS) via public network 190.

Orchestration server 126 may include one or more network devices, or other types of computation or communication devices (e.g., a server device, an application server device, a Web server device, a database server device, a computer, etc.), to link user devices 170 with other devices in network 100, such as catalog server 122, application server 124, profile server 130, billing server 140, etc.

Orchestration sever 126 may provide a proxy service (e.g., a server layer) that links a client application (e.g., an application that provides access from user device 170 to content provided by the digital and physical content system) on user devices 170 with other backend devices in a backend of network 100, such as catalog server 122, application server 124, bounty server 128, profile server 130, billing server 140, etc. Backend devices may communicate with orchestration server 126 using any preferred format, and orchestration server 126 may communicate with the respective user devices 170 (e.g., tablet device and laptop computer) using protocols appropriate for the particular user device 170. Additionally, orchestration server 126 may provide a unified interface for the user device to communicate with different backend devices.

Bounty server 128 may track referrals from partner applications to content in the digital and physical content system. Bounty server 128 may also determine when conditions are met that require bounties to be provided to partners associated with the partner applications that refer user devices 170 (and/or users) to (in some instances, particular) content in network 100 as described below, for example, with respect to FIG. 7 and process 700 below. Partners may include devices, systems and applications for a separate third party entity (e.g., a video game company that uses a separate video game platform, an interactive website, etc.) that interacts (including providing referrals) with network 100. Bounties may include payment to the referring parties based on the referrals to particular content in network 100. Bounty server 128 may determine and assign bounties based on predetermined criteria.

Profile server 130 may store user profile information for users (e.g., users associated with user devices 170). The user profile information may include various information regarding a user, such as login information (e.g., a user identifier and a password), bitting information, address information, types of services to which the user has subscribed, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 170, a video application identifier associated with the video application obtained from application server 124, or the like. Application server 124 may use the user profile information from profile server 130 to authenticate a user and may update the user profile information based on the user's activity (e.g., with a user's express permission).

Billing server 140 may manage charging users for services provided via network 100. Billing server 140 may include, for example, a payment processing component, a billing component, and/or a settlement component.

Physical content distribution system 150 may track availability of physical content (e.g., DVDs, Blu-ray discs, memory cards, etc.) and provide metadata relating to the physical content for inclusion in catalog information provided to users of user devices 170. In one implementation, physical content distribution system 150 may also provide physical content information, such as location information, so that when a user wants to buy physical content, the system may direct the user to the nearest location for purchasing the physical content. Additionally, or alternatively, physical content distribution system 150 may generate or receive credit information for users (e.g., for cross-promotion purposes). For example, after a user of user device 170 has purchased digital content or a subscription/rental of digital content, the user may be entitled to credits for obtaining a corresponding physical asset or vice versa.

Customer support system 160 may solicit and/or receive user feedback, questions, or credit-related requests.

User devices 170 may enable a user to view video content or interact with another user device 170 or a video display device (e.g., a set-top box and/or television). User devices 170 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

In implementations described herein, user devices 170 may include client-side applications that enable user devices 170 to communicate with, for example, data center 120 and/or present information received from data center 120 to a user. A first client-side application may enable communication with the digital and physical content system to support tracking of referrals, and corresponding allocation of bounties to partner applications. The client-side application may direct a user to download a second client-side application. The second client-side application may permit a user of a user device 170 to log into an account (e.g., via application server 124), access catalog information (e.g., from catalog server 122), submit an order, and/or consume live streaming video content (e.g., from VCMS 110).

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 140, physical content distribution system 150, and/or customer support system 160. Private network 180 may be protected/separated from other networks, such as public network 190, by a firewall. Although shown as a single element in FIG. 1, private network 180 may include a number of separate networks.

Public network 190 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, public network 190 may include a number of separate networks that time on to provide services to user devices 170.

In implementations described herein, network 100 may include a digital and physical content system for providing content to user devices 170. The digital and physical content system may have an associated service provider that administers the digital and physical content system, including providing payment to partners ("bounties") for referring users to the digital and physical content system. Bounty payments may be determined based on referrals to content provided in the digital and physical content system (e.g., for referrals to a particular film included in a list provided by catalog server 122 and available via an application provided by application server 122 from VCMS 110, to a user that has been registered and validated using information provided by profile server 130). Additionally, referring parties and referred content may be tracked across multiple applications and user devices 170 associated with a particular user.

Figure 2:
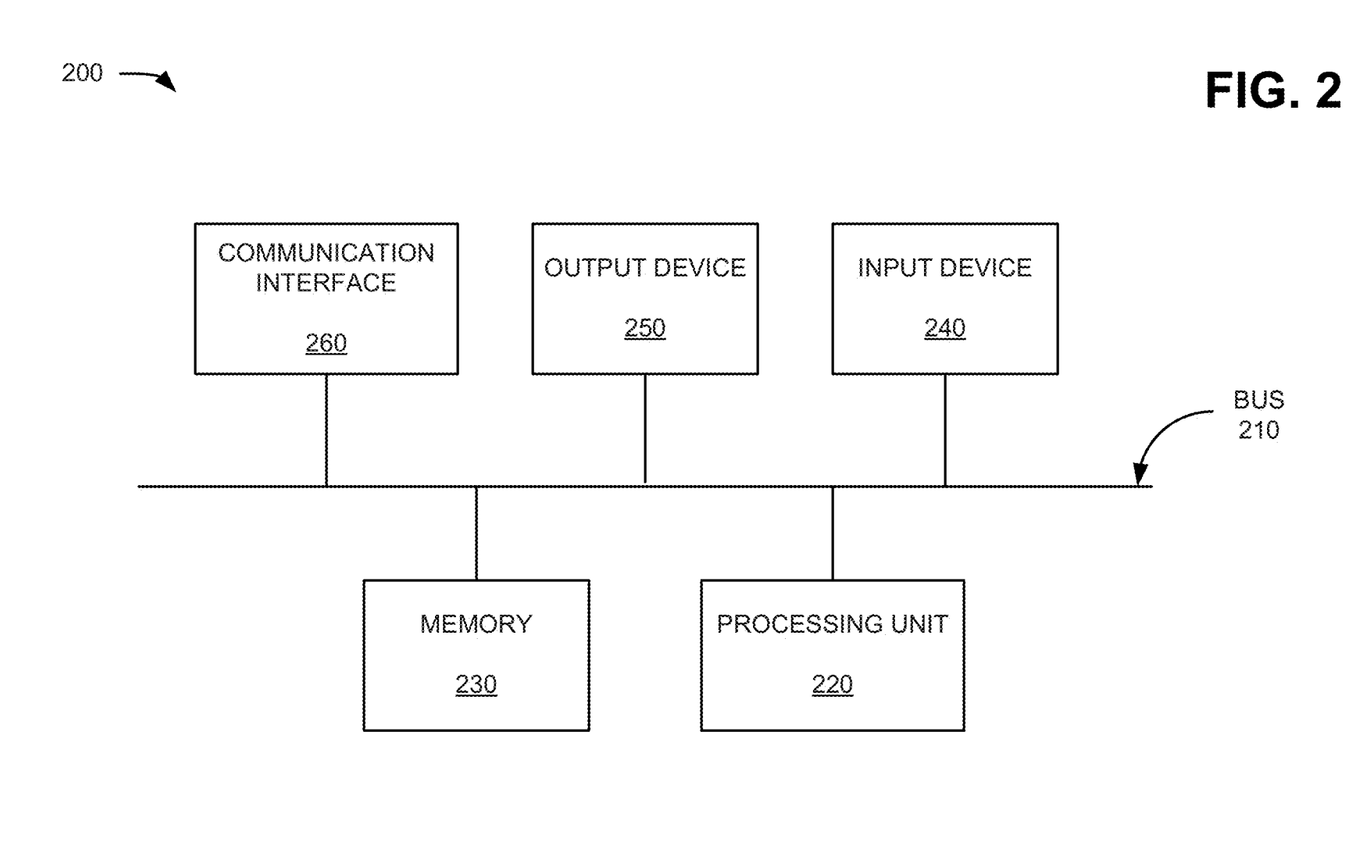
FIG. 2 is a block diagram of exemplary components of a device that may correspond to one of the devices of FIG. 1.

FIG. 2 is a of exemplary components of a device 200 that may correspond to VCMS 110, content delivery system 112, DRM server 114, data center 120, catalog server 122, application server 124, profile server 130, billing server 140, physical content distribution system 150, customer support system 160, or user device 170. Each of VCMS 110, content delivery system 112, DRM server 114, data center 120, catalog server 122, application server 124, profile server 130, billing server 140, physical content distribution system 150, customer support system 160, and user device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 260. A computer-readable medium may include a non-transitory memory device. A memory device may include space within a single physical memory device or spread across multiple physical memory devices. The software instructions may be read into memory 260 from another computer-readable medium or from another device via communication interface 250. The software instructions contained in memory 260 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3A:
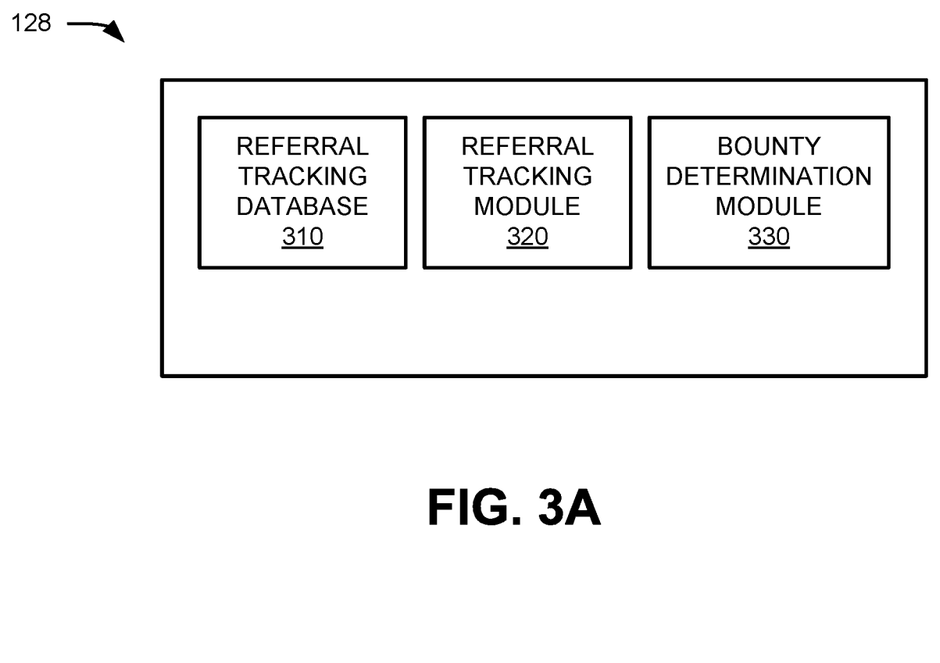
FIG. 3A is a diagram of exemplary functional components of the bounty server of FIG. 1.
Figure 3B:
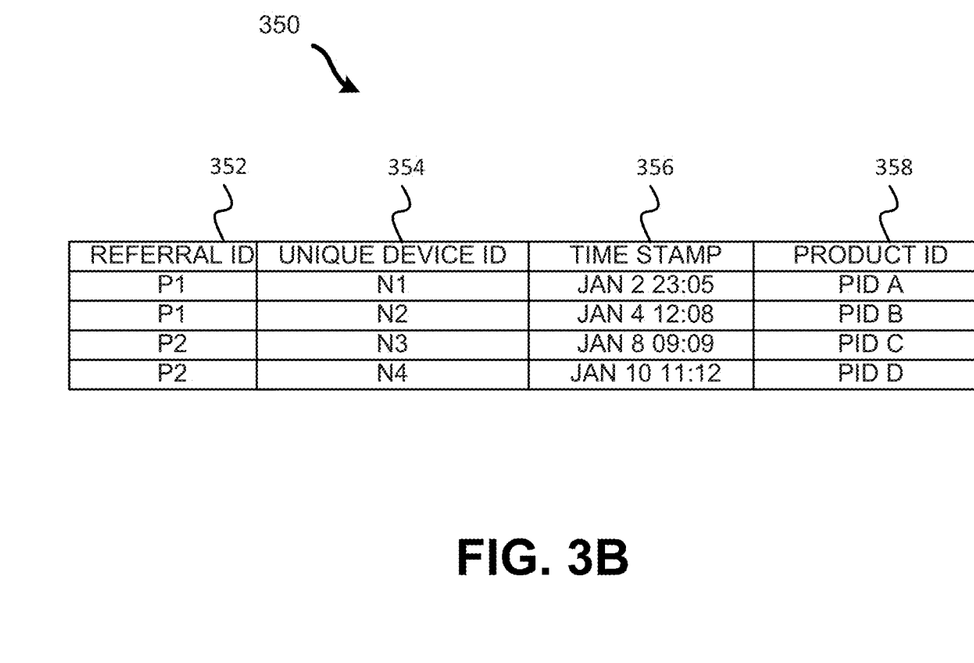
FIG. 3B is a diagram of an exemplary referral tracking table.

FIG. 3A is a diagram of exemplary functional components of bounty server 128. In one implementation, the functions described in connection with FIG. 3A may be performed by one or more components of device 200 (FIG. 2). As shown in FIG. 3A, bounty server 128 may include a referral tracking database 310, a referral tracking module 320, and a bounty determination module 330. FIG. 3B illustrates referral tracking table 350 showing exemplary information contained in referral tracking database 310. Although table 350 is described with respect to bounty server 128, table 350 may be implemented in other parts of network 100. Additionally, bounty server 128 may implement tracking of referrals using other tables or memory structures in network 100. The particular arrangement and number of components and/or entries in bounty server 128 and table 350 as shown in FIGS. 3A and 3B are illustrated for simplicity.

Referral tracking database 310 may include information that may be used to track referrals from partner applications to the digital and physical content system and to determine when conditions are met for allocation of bounties based on the referrals. For example, referral tracking database 310 may store information, such as shown in bounty referral table 350 (FIG. 3B).

As shown in FIG. 3B, each entry in referral tracking table 350 may include a referral ID 352, a unique device ID 354, a time stamp 356, and a product ID 358. Referral ID 352 (shown in FIG. 3A as P1, P2) may identify a referring partner for each referral. For example, referral ID 352 may identify a partner associated with a partner application that refers a user or user device 170 to the physical and digital content system. Unique device ID 354 may identify each user device 170 that is referred to the physical and digital content system (i.e., a referred user device 170). Unique device ID 354 (shown in FIG. 3A as N1, N2, N3, and N4) may be an identifier associated with the user device 170, such as an international Mobile Equipment Identity (IMEI) number, a mobile equipment identifier (MEID) or other unique identifier for user device 170. Time stamp 356 (shown in FIG. 3 as January 2, 23:05, etc.) may include a date and a time that each referral was made. Time stamp 356 may identify when referrals are made and enable determinations of whether or not the referring application is due a bounty based on business rules, e.g., if the user signs up a week later. Bounty server 128 may determine time stamp 356 and include instructions to not rely on the user device 170 to send time stamp 356 (i.e., data and time information) as information sent from user device 170 may be incorrect. Product ID 358 may identify a particular product the user was initially trying to watch and enable administrators to track whether it actually converted into a viewing.

Referral tracking module 320 may receive initial referral information, such as information contained in referral tracking table 350 (i.e., a referral information entry), for example from a referred user device 170 associated with a particular user, when the user is initially referred to the digital and physical content system. Referral tracking module 320 may receive the referral information entry from user device 170 that does not initially include a video content application that interfaces with the digital and physical content system, for example as described below with respect to FIG. 6 and data flow diagram 600. Referral tracking module 320, for example at a later time, may also receive sign-up information including registration data and a registration time as a part of the user profile (e.g., from profile server 130) when the user signs up for service from the physical and digital content service provider. The sign-up information may include a user ID and a date and time at which the user signed up for service from the service provider associated with the digital and physical content system. Referral tracking module 320 may map sign-up information to the referral information entry based on, for example, a common (to both referral information and sign-up information) unique identifier, such as unique device ID 354.

Bounty determination module 330 may determine whether referring partners are due bounties for referrals (i.e., determine payment eligibility). For example, bounty determination module 330 may track that the user remains a customer for the specified amount of time (e.g., based upon predetermined business rules or agreements) that then makes a bounty eligible to be paid out to a referring partner. Bounty determination module 330 may provide bounty payment information that may be accessed by an administrator of the digital and physical content system (e.g., an administrator responsible for providing bounty payments to referring partners).

Alternatively, in instances in which user device 170 includes a video content application that interfaces with the digital content system at the time of referral, bounty determination module 330 may receive tracking information as well as sign-up information from a mobile application associated with user device 170, e.g., via a sign-up API associated with user device 170 after a new registration is complete and orchestration server 126 syncs (i.e., synchronizes particular information) to bounty server 128. For example, tracking information may include information that may be used to track referrals from partners, such as information included in table 350. The sign-up information may include initial registration information, such as a date and time of registration and user profile information, including a user ID.

According to an implementation, referral tracking module 320 may link tracking information with user profile information to table monitoring of overall metrics for the user and to support enforcement of business rules based on multiple registrations by a same user, such as when the user cancels and re-registers later. In these instances, bounty determination module 330 may disallow bounties for referrals based on previous sign-ups and/or bounties paid in association with the same user.

According to an implementation, bounty server 128 may retain referral information that may enable administrators to implement analysis of referral patterns for the digital content and physical content system. For example, bounty server 128 may aggregate referral information based on commonalities in user profile information, such as associated demographic information, zip codes, and patterns interaction with the digital content and physical content.

Figure 4:
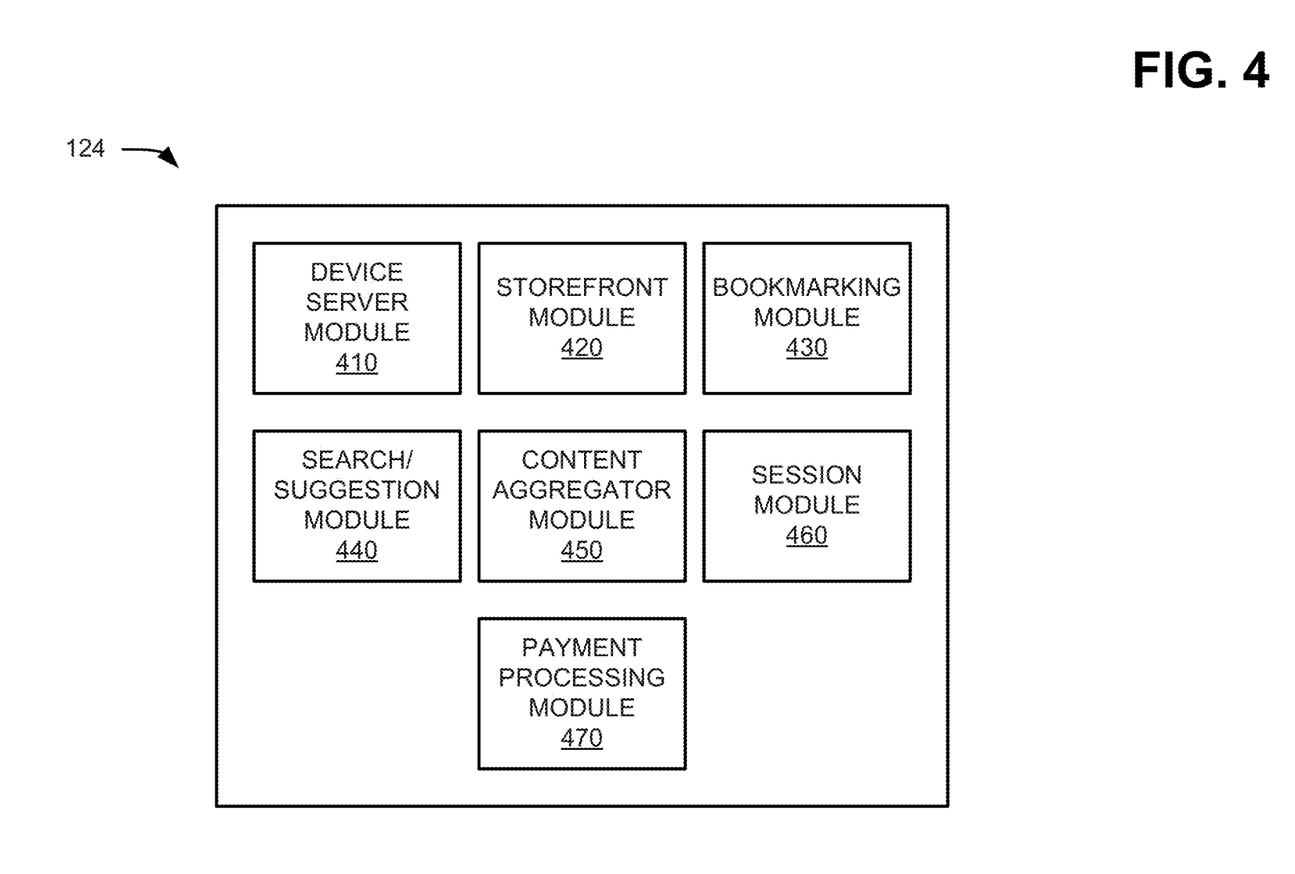
FIG. 4 is a diagram of exemplary functional components of the application server of FIG. 1.

FIG. 4 is a diagram of exemplary functional components of application server 124. In one implementation, the functions described in connection with FIG. 4 may be performed by one or more components of device 200 (FIG. 2). As shown in FIG. 4, application server 124 may include a device server module 410, a storefront module 420, a bookmarking module 430, a search/suggestion module 440, a content aggregator module 450, a session module 460, and a payment processing module 470.

Device server module 410 supports interactions between user devices 170 and backend servers, including (but not limited to) catalog server 122, content delivery system 112, and DRM server 114. Device server module 410 may determine which content format to use according to the device type or platform. Device server module 410 may also aggregate content from different servers according to requests from user devices 170. In one implementation, device server module 410 may also temporarily cache some content locally for performance purposes.

Storefront module 420 provides a user interface to enable users to review and select content in a variety of formats, including digital content and physical content. Storefront module 420 may support browsing and searching of the catalog (e.g., a unified catalog compiled by catalog server 122) from user devices 170. Storefront module 420 may also provide an electronic shopping cart, transaction management, and/or promotions and advertisements.

Bookmarking module 430 tracks user viewing position (e.g., within particular digital content) and allows users of user devices 170 to view the content from the most recently viewed position. In one implementation the most recently viewed position may be based on viewing from the same user device 170. In another implementation the most recently viewed position may be based on the user account (e.g., regardless of the particular user device 170). For example, when a user starts to view a video, bookmarking module 430 may asks a user where to start the presentation, the beginning or where it was stopped from last time.

Search/suggestion module 440 provides a user interface to enable a user to search the catalog by keywords or review content suggestions or recommendations. Search/suggestion module 440 may recommend particular content to the user based on the user's search terms, profile, viewing history, or previously purchased content. Search/suggestion module 440 can also recommend physical assets based on the digital viewing history or personal preferences.

Content aggregator module 450 aggregates information from Internet searching and social networks related to particular content (e.g., a program or video) for a user to view and share. In one implementation, content aggregator module 450 may provide links or other menu options to enable a user to select related content provided by content aggregator module 450.

Session module 460 receives user login information and forwards the user login information to profile server 130 (e.g., in conjunction with application server 124) for validation. For example, session module 460 may collect user login information from user device 170 and forward the login information to profile server 130. Assuming the user is authenticated (e.g., by profile server 130 or physical content distribution system 150), session module 460 may receive a session token and send the session token to user device 170.

Payment processing module 470 may include an interface with billing server 140 to bill the customer for the transaction of a purchase, a rental or a subscription. In one implementation, payment processing module 470 may also include a credit exchange interface with physical content distribution system 150. For example, when a user purchases digital content, coupon credits for getting physical media (e.g., DVDs or Blu-ray discs) may be deposited to a user account associated with physical content distribution system 150.

Figure 5:
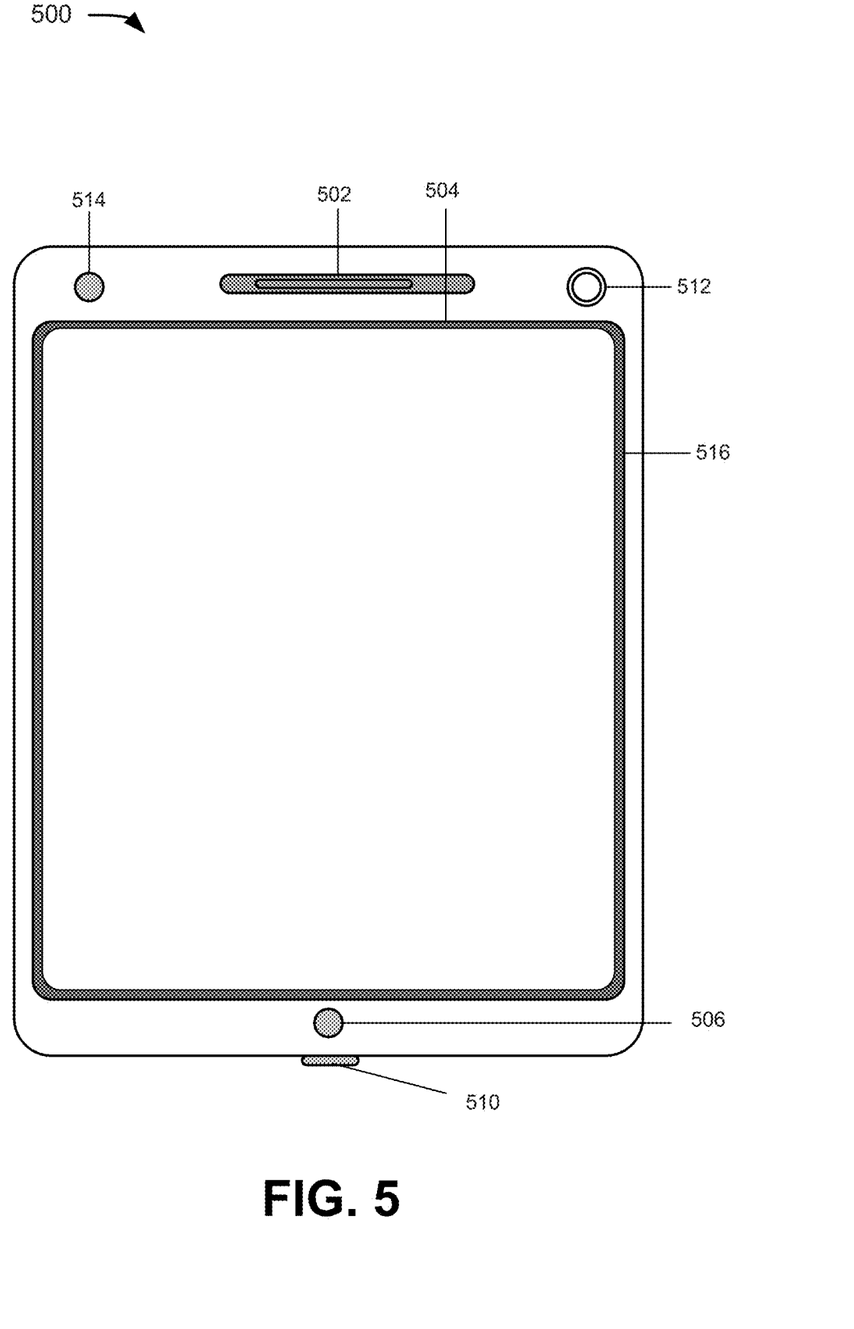
FIG. 5 is a is a diagram of an exemplary device in which methods and systems described herein may be implemented.

FIG. 5 is a diagram of an exemplary device 500 in which methods and systems described herein may be implemented. Although illustrated as a tablet or touch screen device, device 500 may include any of the following devices: an electronic notepad, a tablet computer, a laptop, and/or a personal computer; a personal digital assistant (PDA) that can include a telephone; a mobile telephone; a cellular phone; a personal communications system (PCS) terminal that may combine a cellular radiotelephone with data processing, facsimile, and/or data communications capabilities; a gaming device or console; a peripheral (e.g., wireless headphone); a digital camera; or another type of computational or communication device.

In this implementation, device 500 may take the form of a tablet computer. As shown in FIG. 5, device 500 may include a speaker 502, a touchscreen display 504, control button 506, a microphone 510, sensors 512, a front camera 514, and a housing 516. Speaker 502 may provide audible information to a user of device 500. Although device 500 is shown with particular components and a particular configuration, device 500 may include fewer, more or different components, such as additional sensors, input devices, and may include associated devices a stylus) etc.

Display 504 may provide visual information to the user, such as an image of a caller, video images, or pictures. In addition, display 504 may include a touchscreen for providing input to device 100. Display 504 may provide hardware/software to detect the coordinates of an area that is touched by a user. For example, display 504 may include a display panel, such as a liquid crystal display (LCD), organic light-emitting diode (OLED) display, and/or another type of display that is capable of providing images to a viewer. Display 504 may include a transparent panel/surface for locating the position of a finger or an object (e.g., stylus) when the finger/object is touching or is close to display 504.

Control button 506 may permit the user to interact with device 500 to cause device 500 to perform one or more operations, such as place or receive a telephone call, input data to device 500, manipulate user interface elements, etc. In some implementations, control buttons 506 may include a telephone keypad (not shown) or an alphanumeric keyboard. Microphone 510 may receive audible information from the user. Sensors 512 may collect and provide, to device 500, information (e.g., acoustic, infrared, etc.) that is used to aid the user in capturing images or in providing other types of information (e.g., a distance between a user and device 500). Front camera 514 may enable a user to view, capture and store images (e.g., pictures, video clips) of a subject in front of device 500. Housing 516 may provide a casing for components of device 500 and may protect the components from outside elements.

According to an implementation, device 500 may be a consumer electronic device that includes a referral ID that is unique to a platform associated with device 500 (e.g., Microsoft may have a referral ID for all X-box consoles). Device 500 may also include a referral application that may include a referral ID along with sign-up information via a sign-up API to orchestration server 126 (orchestration server 126 may sync the sign-up information and referral ID to bounty server 128).

Figure 6:
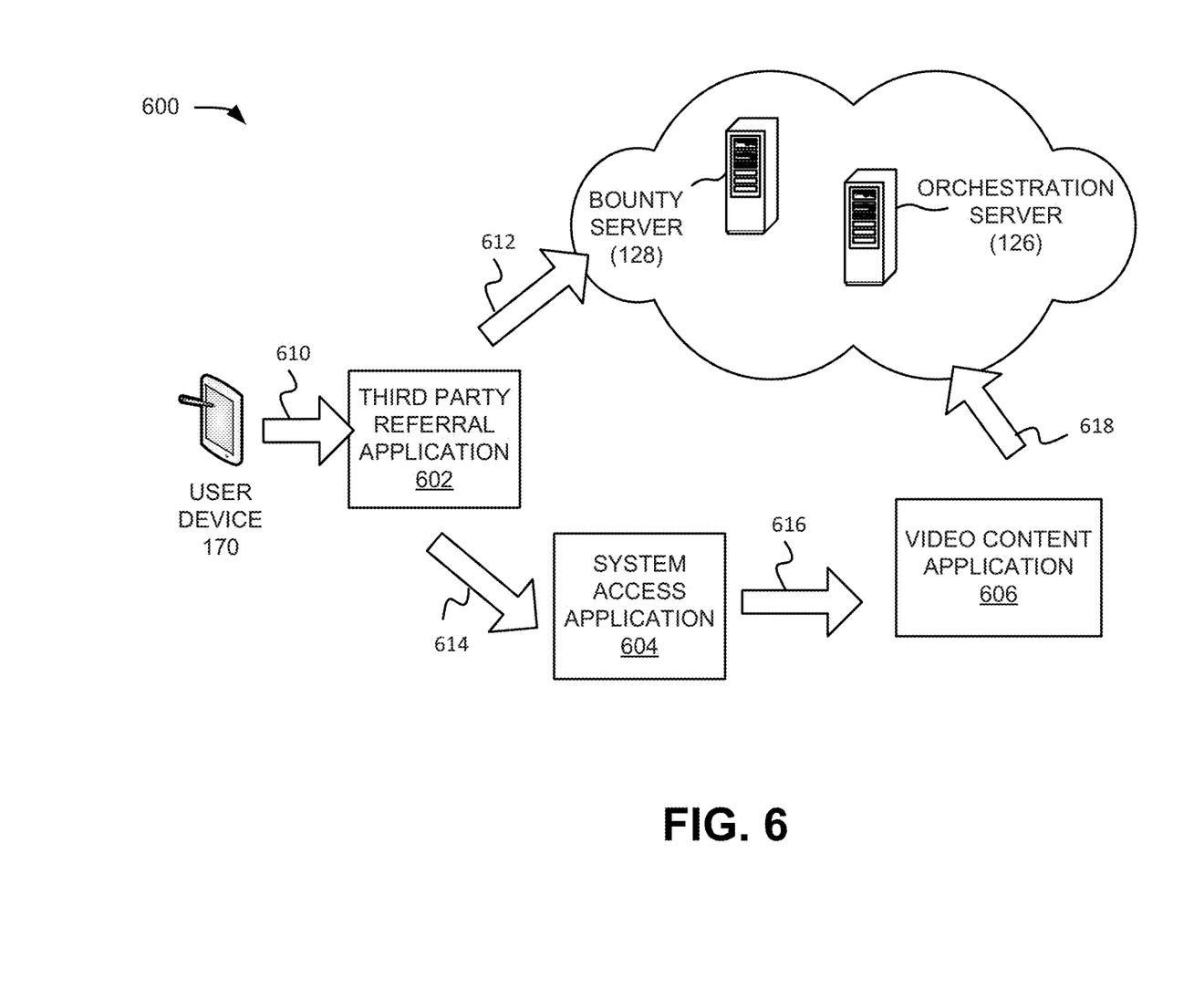
FIG. 6 is a data flow diagram of referral tracking consistent with embodiments described herein.

FIG. 6 is a data flow diagram 600 illustrating digital transactions (indicated by arrows 610-618) that implement referral tracking in network 100 when user device 170 is initially not configured to interface with the digital and physical content system. Arrows 610-618 indicate a general direction of transfer of information. Data flow diagram 600 may include applications, such as a third party referral application 602 (that supports third party referrals), a system access application 604 (that provides applications to access the digital and physical content system), and a video content application 606 (that allows a user to access content associated with the user (e.g., sign-up and purchase the content)), which may each include machine-readable instructions that may be executed on user device 170 (and associated back-end devices in network 100) to provide their respective functions. Additionally, data flow diagram 600 includes orchestration server 126 and bounty server 128 that may receive information and implement referral tracking network 100.

As shown in FIG. 6, user device 170 may initiate a transaction (indicated by arrow 610) when a user inputs instructions that start a third party referral application 602 that includes a link, such as an application programming interface (API), to the digital and physical content system, in particular bounty server 128. For example, third party referral application 602 may be initiated when the user accesses particular content in the partner application (e.g., a social networking application, a gaming application, etc.). The user may be provided a referral to content provided by the digital and physical content system. The referral may indicate available content/service/product from the physical and digital content system (e.g., audio, video, text, and/or images), and, in some instances, terms and conditions associated with the content/service/product. Third party referral application 602 may be a part of, or associated with, a partner application that is separate from the digital and physical content system. The partner application may provide functionality and/or content on a different platform (e.g., a separate network that may not interface with network 100).

If the user responds (i.e., provides a particular input in response) to the referral provided by third party referral application 602, third party referral application 602 may determine whether video content application 606 has been installed on user device 170. Third party referral application 602 may run an application/sub-routine that includes an if-then statement; if video content application 606 is installed (not shown in FIG. 6), third party referral application 602 may provide a sign up interface and transfer referral information directly to digital and physical content system and bounty server 128.

If video content application 606 is not installed, third party referral application 602 may provide referral information from user device 170 to bounty server 128. For example, third party referral application 602 may contact the digital and physical content system and bounty server 128, or a server associated with bounty server 128, such as application server 124, may provide a referral tracking API to user device 170 that may track various items associated with the user or user device 170. Bounty server 128 may tog referral information, such as contained in an entry of table 350, shown in FIG. 3B, including a referral ID 352 to identify what partner application was the source of the referral, a product ID 358 to identify particular product that the user device 170 selected (i.e., "deep-linked" to), a time stamp 356, and a unique device ID 354 of user device 170.

Third party referral application 602 may provide a link connecting the user to system access application 304 (indicated by arrow 614). For example, third party referral application 602 may load an interface that includes system access application 604. System access application 604 may include a digital application storefront interface from which the user may obtain an application, such as video content application 606, which provides access to the digital and physical content system. System access application 604 may install machine-readable instructions to implement video content application 606 on user device 170 (indicated by arrow 616).

The user may register to the digital and physical content system using a user interface associated with video content application 606 (indicated by arrow 618). The user may provide information requested in association with the digital and physical content system, such as a name, account information, etc. Profile server 130 may provide an authentication and registration API (not shown) to physical content distribution system 150. The authentication and registration API may permit profile server 130 to register new users with the digital and physical content system or to initiate user authentication procedures for the digital and physical content system.

Video content application 606 may include different APIs to user device 170 depending, for example, on the type of operating system included on user device 170. For example, an application server API may include a web (e.g., web 2.0) API, an Andriod® API, an iOS API, or a Windows Phone® API. Other APIs may be provided for other applications, such as television-embedded applications, smart appliances, etc. Another API provided by the application server in data center 120 may enable user device 170 to view and/or order content from catalogs provided via data center 120. The content may be delivered in a cross-platform format and may include digital content, which may be associated with one platform (e.g., a platform associated with a first provider, such as a digital content provider) and managed using VCMS 110, and physical content, which may be associated with another platform (e.g. a platform associated with a physical content provider) and managed using physical content distribution system 150.

Bounty server 128 may identify new sign-ups with unique identifiers, such as unique device ID 354, and a user ID, and track behavior of the user to determine eligibility for referring bounties from partners, such as described below with respect to FIG. 7 and the process 700.

Although FIG. 6 shows exemplary transactions implementing indirect referral tracking and bounty referrals, in other implementations, indirect bounty referrals may be implemented using different transaction, order of transactions or combination of transactions than depicted in FIG. 6.

Figure 7:
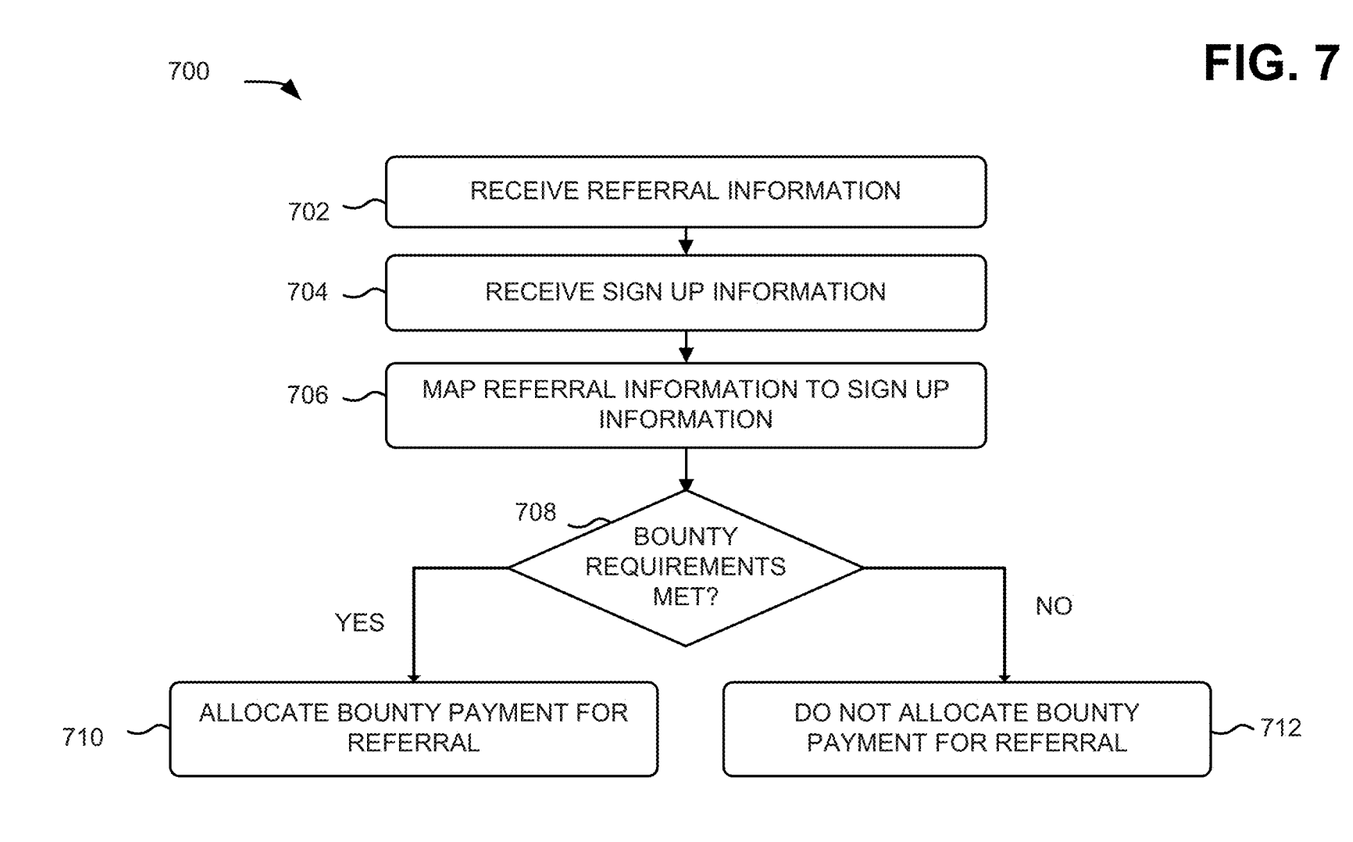
FIG. 7 is a flow chart of an exemplary process for tracking referrals according to an implementation described herein.

FIG. 7 is a flow chart of an exemplary process for tracking bounty for referrals according to implementations described herein. Process 700 is described with respect to table 350, shown in FIG. 3B, for illustrative purposes. In one implementation, process 700 may be performed by bounty server 128. In another implementation, some or all of process 700 may be performed by another device or group of devices, including or excluding bounty server 128.

As shown in FIG. 7, bounty server 128 may access referral information associated with one or more user devices 170, such as shown in table 350 (block 702). Bounty server 128 may receive referral information, e.g., from user device 170 when a referral to (a product or service provided in association with) the digital and physical content system by an application associated with a partner of the service provider of the digital and physical content system. The referral information may include a referral ID 352, a unique device ID 354, a time stamp 356, and a product ID 358, for example as shown in table 350 and described with respect to FIG. 3B above.

The referral information may be saved at bounty server 128 at a first time, to be used to determine eligibility for a referral bounty at a later time when the user, identified based on a unique ID that may be associated with the user, such as a unique device ID 354, an Internet Protocol (IP) address, etc., completes a required transaction. The referral information may be saved at bounty server 128 for a predetermined time during which the referring party is eligible for the referral bounty (e.g., eligibility for a referral bounty may expire after a week).

At block 704, bounty server 128 may receive sign-up information, e.g., when the user completes a sign-up (or purchase) process for a product or service provided in association with the digital and physical content system. The sign-up information may include a name, and other registration information as well as a unique device ID 354 of user device 170. Alternatively, bounty server 128 may receive other information indicating completion of a transaction that qualifies for a referral bounty (e.g., a bounty may be provided based on the user signing up for a service, or an identified user purchasing or browsing particular content). The sign-up information may be received after the referral information at a time that is uncorrelated to the first time (i.e., there is no direct elation between when a user is referred and when the user signs-up).

Bounty server 128 may map the sign-up information to the referral information (block 706). For example, bounty server 128 may match the unique device ID 354 included in the sign-up information to a unique device ID 354 included in a referral tracking database 310, which includes referral information, such as shown in table 350. A match may indicate that one of the referred user devices 170 indicated in table 350 has completed a sign-up process and that the referring partner associated with a referral ID 352 included in the referral information may be due a bounty for the referral. In other instances there may not be a matching unique device ID 354 in the referral information. In these instances the user may have connected to the digital and physical content system independent of any referring partners.

Bounty server 128 may determine whether requirements to provide payment for referrals have been met (block 708). Bounty server 128 may determine, based on business rules, whether a referral qualifies for a bounty. For example, bounty server 128 may determine based on business rules that determine bounty payment eligibility, such as whether the user signed up for the service within a predetermined time (e.g., within a week of the referral), whether the user retains the service for a predetermined minimum time (e.g., for at least one month), and a type of service that the user signs up for.

At block 710, bounty server 128 may provide a bounty payment in response to a determination that requirements to provide payment for a referral have been met (block 708, yes). At block 712, if the requirements to provide bounty payments have not been met (block 708, no), bounty server 128 may store the referral information for a time required by business rules and for analytical purpose, such as analysis of traffic drivers to the digital and physical content system.

Figure 8:
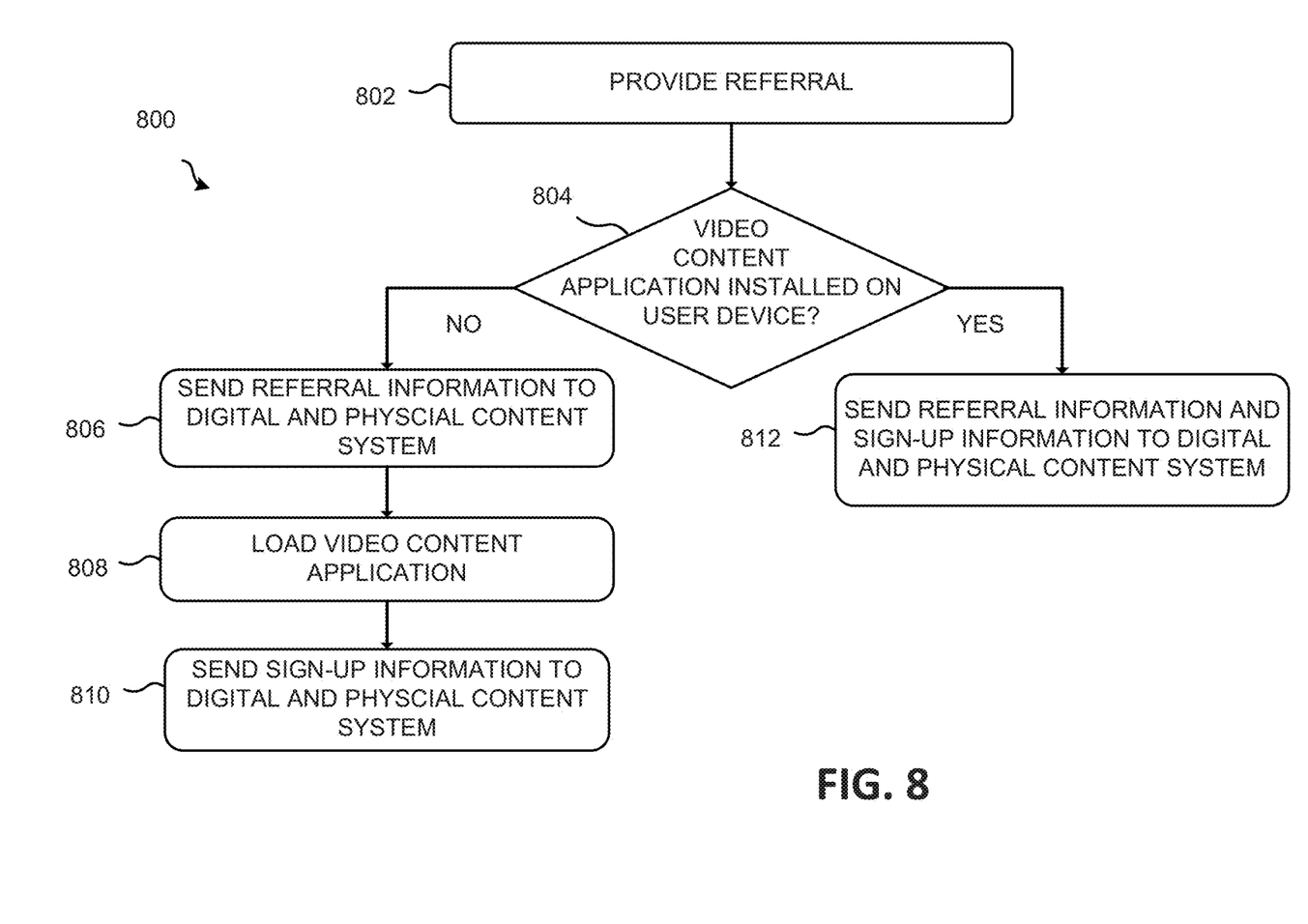
FIG. 8 is a flow chart of an exemplary process for tracking referrals according to an implementation described herein.

FIG. 8 is a flow chart of an exemplary process for tracking bounty for referrals according to implementations described herein. Process 800 is described with respect to data flow diagram 600, shown in FIG. 6, for illustrative purposes. In one implementation, process 800 may be performed by user device 170. In another implementation, some or all of process 800 may be performed by another device or group of devices, including or excluding user device 170.

As shown in FIG. 8, user device 170 may activate a third party referral application 602 that provides a referral to a product provided in association with the digital and physical content system (block 802). For example, the referring application may provide a link to a specific product provided in association with the digital and physical content system.

At block 804, user device 170 may determine whether a video content application 606 that interfaces with the digital and physical content system is installed on user device 170. For example, user device 170 may access a directory of applications to identify whether the video content application is installed on user device 170.

At block 806, if video content application 606 is not installed on user device 170 (block 804, no), third party referral application 602 may send referral information to the digital and physical content system. For example, third party referral application 602 may send the referral information to bounty server 128 in the digital and physical content system.

User device 170 may load video content application 606 on user device 170 (block 808). For example, user device may open a digital application storefront interface from which the user may obtain video content application 606. The user may select video content application 606 and download and install video content application 606 on user device 170.

At block 810, user device 170 may send sign-up information to the digital and physical content system. For example, user device 170 may receive sign-up information from the user via a user interface associated with the digital and physical content system. User device 170 may transfer the sign-up information to the digital and physical content system, which may determine bounty payments as described with respect to FIG. 7 and process 700.

At block 812, user device 170 may send referral information and sign-up information to the digital and physical content system if the video content application 606 is installed on user device 170 (block 804, yes). For example, third party referral application 602 may collect referral information and may provide the referral information to be included in data sent by video content application 606 at a time that the user registers for service.

Systems and/or methods described herein may implement referral tracking for referrals across different applications and devices for particular users. Although referral tracking has been described with respect to a unique device identifier associated with a user, principles described herein may be extended to other systems that identify a user across different platforms, such as a network address, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7 and 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
aggregating, transcoding and encrypting content, by a video content management system (VCMS), wherein the VCMS includes a content delivery system and a digital rights management (DRM) device;
at least one of issuing, validating or enforcing DRM licenses, by the DRM device, by authenticating at least one of users or user devices;
receiving, by a processing device, referral information from a user device, wherein the referral information indicates that a user associated with the user device was referred to a physical and digital content system that includes digital and video content by a referring partner application associated with the physical and digital content system, wherein the referring partner application comprises a social networking application or a gaming application;
storing the referral information in a database for a first period of time, wherein the first period of time corresponds to a time in which an entity associated with the social networking application or gaming application is eligible to receive a bounty payment based on the social networking application or gaming application referring the user to the physical and digital content system, and wherein the database stores referral information entries comprising an identifier for the referring partner application, a product identifier for a product or service, a time stamp of the referral, and a unique identifier associated with the user device;

accessing, by a processing device, the database to identify at least one referral information entry associated with the user device based on a referral from the referring partner application for a product or service in the digital and physical content system;

receiving sign-up information from the user device, in response to the user associated with the user device completing a sign-up or purchase process for a product or service provided via the physical and digital content system, wherein the sign-up information includes the unique identifier of the user device and a time of the sign-up or purchase;

mapping the sign-up information to the at least one referral information entry in the database to determine whether the user device was referred to the physical and digital content system by the referring partner application; and determining, in response to determining that the user device was referred to the physical and digital content system by the referring partner application, whether bounty requirements are met based on at least one predetermined business rule for referral bounties, wherein the determining whether the bounty requirements are met comprises:
determining whether the user associated with the user device retains a service associated with the physical and digital content system for a second period of time, wherein the second period of time is different than the first period of time.

2. The computer-implemented method of claim 1, wherein determining whether the bounty requirements are met based on the at least one predetermined business rule for referral bounties comprises:
determining whether the user associated with the user device signed-up within a predetermined time of the referral.

3. The computer-implemented method of claim 1, wherein a determination that the bounty requirements are met further comprises:
providing a bounty based on a particular service that the user associated with the user device signed-up for.

4. The computer-implemented method of claim 1, wherein a determination that the bounty requirements are met further comprises:
determining bounties based on multiple registrations by the user.

5. The computer-implemented method of claim 1, wherein the unique identifier associated with the user device is one of an International Mobile Equipment Identity (IMEI) number, or a mobile equipment identifier (MEID).

6. The computer-implemented method of claim 1, wherein mapping the sign-up information to the at least one referral information entry to determine whether the user device is the referred user device further comprises:
matching the unique identifier associated with the user device with the unique identifier of the user device received at sign-up.

7. The computer-implemented method of claim 1, wherein the referral is to a uniform resource locator (URL) associated with the product.

8. The computer-implemented method of claim 1, wherein the time stamp of the referral is determined by the digital and physical content system.

9. The computer-implemented method of claim 1, wherein the service is associated with receiving content from the digital and physical content system.

10. The computer-implemented method of claim 1, further comprising:
deleting the referral information in the database after the first period of time expires.

11. A system, comprising:
a video content management system (VCMS) configured to aggregate, transcode and encrypt content, wherein the VCMS comprises a content delivery system and a digital rights management (DRM) device,
wherein the DRM device is configured to:
at least one of issue, validate or enforce DRM licenses by authenticating users or user devices; and
a second device comprising:
a memory to store a plurality of instructions; and
a processor configured to execute instructions in the memory to:
receive at least one referral information entry associated with a referred user device based on a referral from a referring partner application to a product in a digital and physical content system that includes digital and physical video content, wherein the referral information entry includes an identifier for the referring partner application, a product identifier for the product, a time stamp of the referral, and a unique identifier associated with the referred user device, wherein the referring partner application comprises a social networking application or a gaming application;
store the at least one referral information entry in a database for a first period of time, wherein the first period of time corresponds to a time in which an entity associated with the social networking application or gaming application is eligible to receive a bounty payment based on the social networking application or gaming application referring a user associated with the referred user device to the physical and digital content system;
receive sign-up information from a user device, wherein the sign-up information includes a unique identifier of the user device received at sign-up;
map the sign-up information to the at least one referral information entry to determine whether the user device is the referred user device; and
determine, in response to determining that the user device is the referred user device, whether bounty requirements are met based on at least one predetermined business rule for referral bounties,
wherein, when determining whether the bounty requirements are met, the processor is further configured to:
determine whether a user associated with the user device retains a service for a second period of time.

12. The system of claim 11, wherein, when determining whether the bounty requirements are met based on the at least one predetermined business rule for referral bounties, the processor is further configured to:
determine whether the user associated with the user device signed-up within a predetermined time of the referral.

13. The system of claim 11, wherein, when a determination that the bounty requirements are met has been made, the processor is further configured to:
provide a bounty based on a particular service that the user associated with the user device signed-up for.

14. The system of claim 11, wherein, when a determination that the bounty requirements are met has been made, the processor is further configured to:

determine bounties based on multiple registrations by the user.

15. The system of claim 11, wherein the unique identifier associated with the referred user device is one of an International Mobile Equipment Identity (IMEI) number, or a mobile equipment identifier (MEID).

16. The system of claim 11, wherein the referral information entry is stored at a first time in a memory associated with the device and the sign-up information is received at a second time that is subsequent to the first time and uncorrelated to the first time.

17. The system of claim 11, wherein the service is associated with receiving content from the digital and physical content system, wherein the processor is further configured to:
   delete the at least one referral information entry in the database after the first period of time expires.

18. A non-transitory computer-readable medium including instructions to be executed by a processor, the instructions including one or more instructions, when executed by the processor, for causing the processor to:
   receive referral information from a user device, wherein the user device has been validated by a digital rights management (DRM) device included in a video content management system that encrypts content, and wherein the referral information indicates that the user device was referred to a physical and digital content system that includes digital and video content by a referring partner application associated with the physical and digital content system, wherein the referring partner application comprises a social networking application or a gaming application;
   store the referral information in a database for a first period of time, wherein the first period of time corresponds to a time in which an entity associated with the social networking or gaming application is eligible to receive a bounty payment based on the social networking or gaming application referring a user associated with the user device to the physical and digital content system;
   access the database to identify at least one referral information entry associated with a referred user device based on a referral from the referring partner application to a product in the digital and physical content system, wherein the referral information entry includes an identifier for the referring partner application, a product identifier for the product, a time stamp of the referral, and a unique identifier associated with the referred user device;
   receive sign-up information from a user device, wherein the sign-up information includes a unique identifier of the user device received at sign-up, and a time of sign-up;
   map the sign-up information to the at least one referral information entry to determine whether the user device is the referred user device; and
   determine, in response to determining that the user device is the referred user device, whether bounty requirements are met based on at least one predetermined business rule for referral bounties, wherein determining whether the bounty requirements are met comprises:
      determining whether the user associated with the referred device retains a service for a second period of time.

19. The non-transitory computer-readable medium of claim 18, wherein the one or more instructions further includes instructions to:
   determine whether the user associated with the user device signed-up within a predetermined time of the referral.

20. The non-transitory computer-readable medium of claim 18, wherein the service is associated with receiving content from the digital and physical content system, and wherein the instructions further cause the processor to:
   delete the referral information in the database after the first period of time expires.

\* \* \* \* \*